United States Patent
Iggulden et al.

(10) Patent No.: US 7,379,541 B2
(45) Date of Patent: *May 27, 2008

(54) METHOD AND APPARATUS FOR SETTING PROGRAMMABLE FEATURES OF A MOTOR VEHICLE

(75) Inventors: Jerry Iggulden, Los Angeles, CA (US); Kyle Fields, El Dorado Hills, CA (US); Arthur St. Antoine, Los Angeles, CA (US)

(73) Assignee: Pointset Corporation, Los Angeles, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 10/938,689

(22) Filed: Sep. 10, 2004

(65) Prior Publication Data

US 2005/0031100 A1 Feb. 10, 2005

Related U.S. Application Data (63) Continuation of application No. 10/757,087, filed on Jan. 13, 2004, now Pat. No. 7,289,611, which is a continuation-in-part of application No. 10/155,531, filed on May 24, 2002, now Pat. No. 6,882,712, which is a continuation-in-part of application No. 09/415,299, filed on Oct. 8, 1999, now Pat. No. 6,483,906, which is a continuation-in-part of application No. 09/351,270, filed on Jul. 12, 1999, now Pat. No. 6,256,378, which is a continuation-in-part of application No. 09/235,709, filed on Jan. 22, 1999, now Pat. No. 6,415,023.

(51) Int. Cl.
*H04M 11/00* (2006.01)

(52) U.S. Cl. ............................. 379/102.03; 379/102.05

(58) Field of Classification Search ........... 379/102.03, 379/102.01, 102.02, 90.01, 110.01, 93.17, 379/93.25, 102.05

See application file for complete search history.

(56) References Cited

U.S. PATENT DOCUMENTS 3,407,301 A   10/1968   Kovanic (Continued)

FOREIGN PATENT DOCUMENTS

DE    197 50 372 A1    5/1999

(Continued)

OTHER PUBLICATIONS

Shear, D., *Going Global in the Real World: Putting an Embedded System on the Internet*, EDN Electrical Design News, US, Cahners Publishing Co., Newton, Massachusetts, vol. 42, No. 19, Sep. 12, 1997, pp. 37-46.

(Continued)

*Primary Examiner*—Stella L Woo
(74) *Attorney, Agent, or Firm*—Blakely, Sokoloff, Taylor & Zafman, LLP (57) ABSTRACT

An interactive interface facilitates the setting of preferences and other programmable parameters of a motor vehicle. The interface is hosted by a server on a global computer network. The motor vehicle owner initiates a connection to the server and is presented with a graphical user interface for setting the preferences and features of the motor vehicle. Once the desired settings have been made, they are transferred to the motor vehicle using a portable transfer device, which may comprise a key for operating the motor vehicle.

10 Claims, 5 Drawing Sheets

U.S. PATENT DOCUMENTS

| | | |
|---|---|---|
| 3,737,566 A | 6/1973 | Baer et al. |
| 3,993,861 A | 11/1976 | Baer |
| 4,034,362 A | 7/1977 | Balanca et al. |
| 4,329,684 A | 5/1982 | Monteath et al. |
| 4,477,874 A | 10/1984 | Ikuta et al. |
| 4,731,769 A | 3/1988 | Schaefer et al. |
| 4,807,031 A | 2/1989 | Broughton et al. |
| 4,962,522 A | 10/1990 | Marian |
| 4,999,617 A | 3/1991 | Uemura et al. |
| 5,153,568 A | 10/1992 | Shaw |
| 5,228,077 A | 7/1993 | Darbee |
| 5,231,488 A | 7/1993 | Mohrbacher et al. |
| 5,268,995 A | 12/1993 | Diefendorff et al. |
| 5,309,509 A | 5/1994 | Cocklin et al. |
| 5,333,054 A | 7/1994 | Tanaka et al. |
| 5,347,110 A | 9/1994 | Audebert et al. |
| 5,410,326 A | 4/1995 | Goldstein |
| 5,414,756 A | 5/1995 | Levine |
| 5,488,571 A | 1/1996 | Jacobs et al. |
| 5,521,966 A | 5/1996 | Friedes et al. |
| 5,528,740 A | 6/1996 | Hill et al. |
| 5,535,147 A | 7/1996 | Jacobs et al. |
| 5,553,123 A | 9/1996 | Chan et al. |
| 5,570,297 A | 10/1996 | Brzezinski et al. |
| 5,592,188 A | 1/1997 | Doherty et al. |
| 5,594,493 A | 1/1997 | Nemirofsky |
| 5,600,711 A | 2/1997 | Yuen |
| 5,636,994 A | 6/1997 | Tong |
| 5,652,602 A | 7/1997 | Fishman et al. |
| 5,726,645 A | 3/1998 | Kamon et al. |
| 5,732,074 A * | 3/1998 | Spaur et al. ................. 455/457 |
| 5,734,363 A | 3/1998 | Blouin et al. |
| 5,745,068 A | 4/1998 | Takahashi et al. |
| 5,746,602 A | 5/1998 | Kikinis |
| 5,748,895 A | 5/1998 | Shiff et al. |
| 5,752,880 A | 5/1998 | Gabai et al. |
| 5,761,601 A | 6/1998 | Nemirofsky et al. |
| 5,767,896 A | 6/1998 | Nemirofsky |
| 5,774,063 A | 6/1998 | Berry et al. |
| 5,781,125 A | 7/1998 | Godau et al. |
| 5,801,664 A | 9/1998 | Seidensticker et al. |
| 5,805,443 A | 9/1998 | Raffray et al. |
| 5,808,374 A | 9/1998 | Miller et al. |
| 5,815,086 A | 9/1998 | Ivie et al. |
| 5,819,294 A | 10/1998 | Chambers |
| 5,850,304 A | 12/1998 | Elmers |
| 5,852,615 A | 12/1998 | Holo et al. |
| 5,873,765 A | 2/1999 | Rifkin et al. |
| 5,880,769 A | 3/1999 | Nemirofsky et al. |
| 5,905,486 A | 5/1999 | Brittenham et al. |
| 5,907,350 A | 5/1999 | Nemirofsky |
| 5,953,047 A | 9/1999 | Nemirofsky |
| 6,009,355 A | 12/1999 | Obradovich et al. |
| 6,049,778 A | 4/2000 | Walker et al. |
| 6,088,621 A | 7/2000 | Woytowitz et al. |
| 6,104,101 A | 8/2000 | Miller et al. |
| 6,112,127 A | 8/2000 | Bennett |
| 6,131,060 A | 10/2000 | Obradovich et al. |
| 6,157,982 A | 12/2000 | Deo et al. |
| 6,161,133 A | 12/2000 | Kikinis |
| 6,175,782 B1 | 1/2001 | Obradovich et al. |
| 6,198,996 B1 * | 3/2001 | Berstis ........................ 701/36 |
| 6,205,374 B1 | 3/2001 | Kljima et al. |
| 6,230,084 B1 | 5/2001 | Kljima et al. |
| 6,233,506 B1 | 5/2001 | Obradovich et al. |
| 6,256,378 B1 | 7/2001 | Iggulden et al. |
| 6,281,820 B1 | 8/2001 | Fields |
| 6,282,475 B1 | 8/2001 | Washington |
| 6,330,497 B1 | 12/2001 | Obradovich et al. |
| 6,351,813 B1 * | 2/2002 | Mooney et al. ............. 713/185 |
| 6,385,542 B1 | 5/2002 | Millington |
| 6,415,023 B2 | 7/2002 | Iggulden |
| 6,430,488 B1 * | 8/2002 | Goldman et al. ............. 701/36 |
| 6,438,465 B2 | 8/2002 | Obradovich et al. |
| 6,449,535 B1 | 9/2002 | Obradovich et al. |
| 6,483,906 B1 | 11/2002 | Iggulden et al. |
| 6,505,243 B1 | 1/2003 | Lortz |
| 6,577,928 B2 | 6/2003 | Obradovich et al. |
| 6,663,010 B2 | 12/2003 | Chene et al. |
| 6,704,401 B2 | 3/2004 | Piepho et al. |
| 6,751,452 B1 | 6/2004 | Kupczyk et al. |
| 6,754,485 B1 | 6/2004 | Obradovich et al. |
| 6,775,603 B2 * | 8/2004 | Yester et al. .................. 701/36 |
| 7,289,611 B2 * | 10/2007 | Iggulden et al. ....... 379/102.03 |
| 2001/0043686 A1 | 11/2001 | Iggulden et al. |
| 2002/0035429 A1 | 3/2002 | Banas |
| 2002/0097851 A1 | 7/2002 | Daum et al. |
| 2002/0196158 A1 | 12/2002 | Lee |
| 2003/0152088 A1 * | 8/2003 | Kominami et al. ......... 370/401 |

FOREIGN PATENT DOCUMENTS

| | | |
|---|---|---|
| DE | 100 64 937 A1 | 7/2002 |
| DE | 101 31 395-1 A | 1/2003 |
| EP | 0 754 940 A1 | 1/1997 |
| EP | 0803808 | 4/1997 |
| WO | WO 97/18636 | 5/1997 |
| WO | WO 97/30375 | 8/1997 |
| WO | WO 98/38570 | 9/1998 |
| WO | WO-00/43870 | 7/2000 |

OTHER PUBLICATIONS

Batista, Method and Apparatus for programming a device, WO 98/38570, Sep. 1998.

Steinberg et al., Method and Apparatus for Configuring a Camera, WO 97/30375, Aug. 1997.

NBX Corporation, *Product Solutions; NBX NetSet Application Notes; NBX NetSett™ Administration Utility*, website printout, Dec. 14, 1998.

BMW Technology Guide—Car/key memory, BMW AG, Munich, Germany.

Personalized Customer Service in Focus—the Interview on Connected Service, Hans-Jürgen Kiening, Wolfgang Kasser and Andreas Binderberger.

BMW Group Press 2002, pp. 2-15.

Microsoft Corporation, *Setting Up Your Microsoft Cordless Phone is Easy*, website printout, Dec. 15, 1998.

* cited by examiner

| Interior | | | | | |
|---|---|---|---|---|---|
| Audio | Climate | Navigation | Phase | Effects | Touchscreen |

Radio Settings

| | | | |
|---|---|---|---|
| Station presets | Set your station presets<br>○ AM  ● FM1  ○ FM2<br>Freq.    Name<br>1 [92.5]  [KTXL]<br>2 [93.1]  [KRCA]<br>3 [93.9]  [KTAR]<br>4 [100.5] [KWOW]<br>5 [107.9] [KOLT] | Search for stations in your area<br>Zip Code [94086] [Search]<br>Stations found:<br>92.5     KTXL<br>93.1     KRCA<br>94.5     KTAT<br>100.5    KWOW<br>106.5    KWHW<br><br>[<< Copy] | [RESET] |
| Weather interrupt | Automatically change channels to receive weather alert messages | ☑ Yes | |
| Traffic interrupt | Automatically change channels to receive traffic alert messages | ☑ Yes | |
| Standby EBS | Always monitor for emergency broadcast messages (EBS) and automatically turn on radio when found | ☑ Yes | |
| Scan pause | How long to pause when a station is found when scanning | [===|==] 1 sec<br>Short         Long | |

General Audio Settings
[RESET]

| | | |
|---|---|---|
| Speed volume control | Automatically adjusts audio volume based on vehicle speed | [==|===] 4<br>Softer      Louder |
| Volume on phone | Automatically change to this audio volume when phone rings, or when using the phone. | ☐ Disable feature<br>[===|==] 10<br>Softer      Louder |
| Startup options | Automatically set audio volume when starting car after sitting for more than 4 hours | ☐ Disable feature<br>[====|=] 50<br>Low        High |
| | Automatically select audio source when starting car after sitting for more than 4 hours | ☐ Disable feature<br>○ AM  ● FM1  ○ FM2  ○ CD<br>● 1  ○ 2  ○ 3  ○ 4  ○ 5 |

CD Settings

| | | |
|---|---|---|
| Label CDs | Uses CDNOW database to label your car CDs and songs | [Use CDNOW...] |

MP3 Settings

| | | |
|---|---|---|
| Move MP3 files to car | Move MP3 files from your computer to the car | [                    ] [Browse...] |

METHOD AND APPARATUS FOR SETTING PROGRAMMABLE FEATURES OF A MOTOR VEHICLE

RELATED APPLICATIONS

This is a continuation of application U.S. Ser. No. 10/757,087 filed Jan. 13, 2004, now U.S. Pat. No. 7,289,611, which is a continuation-in-part of application Ser. No. 10/155,531 filed May 24, 2002, now U.S. Pat. No. 6,882,712, which is a continuation-in-part of application Ser. No. 09/415,299, filed Oct. 8, 1999, now U.S. Pat. No. 6,483,906, which is a continuation-in-part of application Ser. No. 09/351,270, filed Jul. 12, 1999, now U.S. Pat. No. 6,256,378, which is a continuation-in-part of application Ser. No. 09/235,709, filed Jan. 22, 1999, now U.S. Pat. No. 6,415,023.

BACKGROUND OF THE INVENTION

1. Field of the Invention

This invention relates generally to the field of motor vehicles. More particularly, the invention provides a method and apparatus for conveniently setting various programmable features of a motor vehicle using a graphical user interface accessed with a computer.

2. Prior Art

Motor vehicles, and automobiles in particular, have grown increasingly complex. A modern automobile may contain as many as fifty microprocessors controlling a wide variety of operational and convenience features. While much of the processing power is devoted to functions that are transparent to the driver, the number of driver-selectable features and options has increased tremendously. For example, automobiles may include driver controls for seating position, seat temperature, cabin temperature, cabin ventilation, cabin illumination, dash illumination, audio entertainment, navigation, suspension compliance and transmission shift-mode, to name only a few. Providing driver control of all of these functions has led to a proliferation of knobs, buttons, switches and other controls in many automobiles.

The increased number of driver controls is not without its drawbacks. Typically, drivers must refer to increasingly voluminous owner's manuals to understand the various controls available and learn how to operate them. Naturally, different drivers have different preferences and this can result in a lengthy process of changing settings each time a different driver enters the vehicle. Furthermore, the increased complexity of driver controls is a distraction to the driver and negatively affects traffic safety.

Efforts have been made to simplify the driver/vehicle interface. One such effort is the "iDrive" system introduced by BMW. This system employs a video display and a driver-operated "joystick" to replace many of the individual controls. The system is reported to control more than seven hundred functions. While the system succeeds in eliminating much of the dashboard clutter, it results in as much, if not more, driver distraction than with conventional controls.

Another effort to simplify the driver/vehicle interface (and one that is employed in conjunction with BMW's "iDrive" system) is voice recognition. The vehicle is programmed to learn and respond to certain spoken commands. However, voice recognition technology is still in its infancy and spoken commands are not consistently understood, especially in a typically noisy vehicle environment.

There remains a need for a system and method of interfacing with the myriad of controllable features in a modern automobile without distracting the driver when actually operating the automobile.

SUMMARY OF THE INVENTION

The present invention provides methods and apparatus for setting preferences and other parameters of a motor vehicle. In certain embodiments of the invention, a user initiates a connection to an interactive site on a global computer network. The site hosts a graphical user interface with which preferences and other parameters of a motor vehicle may be set by the user. In some embodiments, set-up data for the motor vehicle may be transferred directly to the motor vehicle from the interactive site. In other embodiments, set-up data for the motor vehicle are transferred from the user's computer to a transfer device where it is temporarily stored. The transfer device, which may comprise a key for operating the motor vehicle, is then used to program the features of the motor vehicle.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
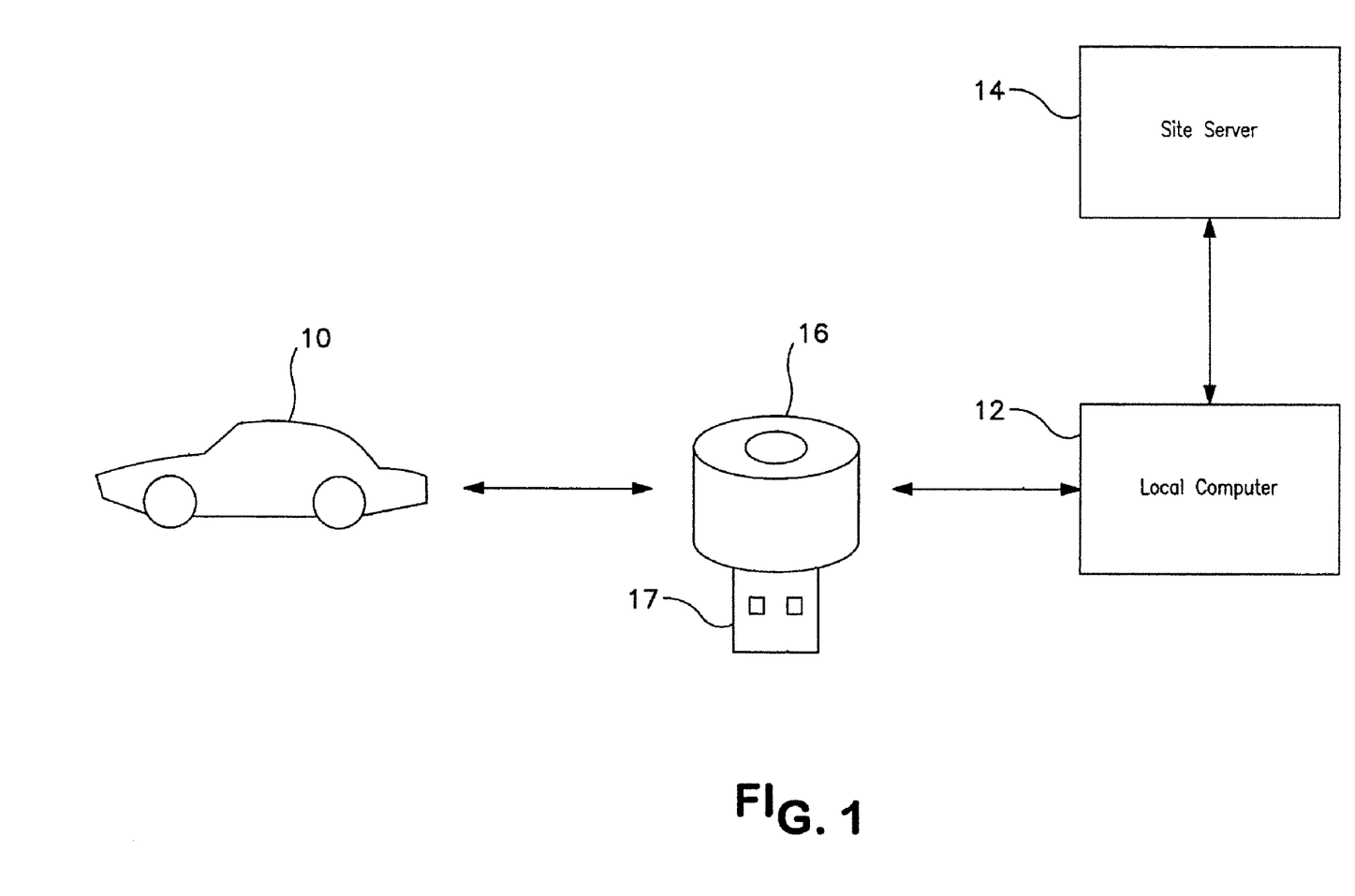
FIG. 1 is a functional block diagram of an embodiment of the invention wherein a motor vehicle receives data from a local computer via a transfer device.

A first embodiment of the invention is illustrated in FIG. 1. A motor vehicle receives set-up data from a local computer 12 via a transfer device 16. In a typical application, local computer 12 is a general purpose personal computer of the type now widely found in homes and offices. Details of computer 12 are not particularly relevant to the invention and are not shown. Typically, computer 12 will comprise, at a minimum, a processing unit, a keyboard and a display. Additional input devices, such as a mouse or other pointing device, and output devices, such as a printer, may also be included as part of computer 12.

Local computer 12 is coupled to a remote interactive site server 14 by a telecommunications link. In a typical embodiment of the invention, interactive site server 14 would be accessible via the World Wide Web. Other appropriate means for connecting computer 12 to server 14 could also be employed. Server 14 contains programming for interactively setting the programmable features of motor vehicle 10.

Preferably, server 14 presents to the owner of motor vehicle 10, via computer 12, a graphical user interface that is tailored to motor vehicle 10 and the programmable features thereof.

Transfer device 16 receives the programming data from local computer 12 by a wired or wireless connection to computer 12. A wired connection may comprise a serial bus configured in accordance with any of the appropriate industry standards, such as, for example, universal serial bus (USB), "FireWire", etc. Wireless connections may comprise optical, audio, magnetic, inductive, infrared or radio frequency coupling. One wireless communication protocol suitable for use with the present invention is the "Bluetooth" protocol, which is now becoming widely installed in home computer systems. Another wireless communication protocol that may be employed with the present invention for transferring data from local computer 12 to transfer device 16 is the video data transfer protocol described in co-pending application Ser. No. 10/155,531 and its predecessor applications. Transfer device 16 also communicates with motor vehicle 10 by means of a wired or wireless connection with a suitable protocol, such as any of those mentioned above.

Communications between local computer 12 and transfer device 16 and between the transfer device and motor vehicle 10 may be either one-way (namely, from the home computer to the transfer device and then to the vehicle) or two-way. However, significant advantages are realized when utilizing two-way communication. Two-way communication allows "synchronization" of the motor vehicle with a "virtual" motor vehicle maintained at the site server 14. Many of the features and settings of the motor vehicle can be controlled directly by the driver while in the motor vehicle. By periodically returning transfer device 16 to computer 12 and reestablishing a connection with server 14, the virtual motor vehicle can be updated with any changes in the settings of the real motor vehicle.

Another advantage of two-way communications is that it may be used to facilitate remote troubleshooting of the motor vehicle. Data from the motor vehicle may be transferred to computer 12, and from there to the motor vehicle manufacturer, dealer or other support facility via an Internet or email connection. Analysis of the data can then be used to issue appropriate repair orders. In some cases, repairs may be effectuated by downloading corrective software or firmware in the same manner that feature set-up is accomplished.

As illustrated in FIG. 1, transfer device 16 may be configured as a device with a USB or other serial bus connection 17 and an internal flash memory or other suitable non-volatile memory device. Such a transfer device is easily portable and may be conveniently carried on a key chain. Transfer device 16 may be simply plugged into a cooperating serial port on local computer 12. In this regard, most home computers are now equipped with easily accessible USB ports. Motor vehicle 10 may also have a cooperating serial port on the dash or console. Operation of motor vehicle 10 may be enabled with a conventional key. Alternatively, however, transfer device 16 may itself function as a key to enable operation of the motor vehicle. In either case, it is preferred that each driver of the motor vehicle have his or her own transfer device so that the vehicle will be automatically configured to that driver's preferences whenever the driver inserts the transfer device into the receiving port.

Transfer device 16 may be configured in numerous other ways. For example, a recordable compact disk (CD) or digital video disk (DVD) could be employed as a transfer device. In this case, set-up data would be written onto the CD or DVD at local computer 12 and the disk would then be loaded into a suitable drive in the motor vehicle. Such an approach is more suitable for one-way communication than two-way communication.

It is also possible to configure a system in which motor vehicle 10 receives set-up data directly from local computer 12 without a transfer device. This can be accomplished by establishing a telephonic connection with the motor vehicle. In this regard, motor vehicles are increasingly being equipped with built-in telecommunications capabilities for implementing a variety of so called "telematic" functions. The communication path might also involve a combination of wired and wireless protocols. For example, local computer 12 may have a wireless link to an in-home transceiver, which is connected to a remote transceiver in the motor vehicle's garage or other parking area by a wired connection. The wired connection may comprise a data communication bus or a communication signal may be carried as a modulation on the household wiring. The garage transceiver then communicates with the motor vehicle using a wireless protocol.

Figure 2:
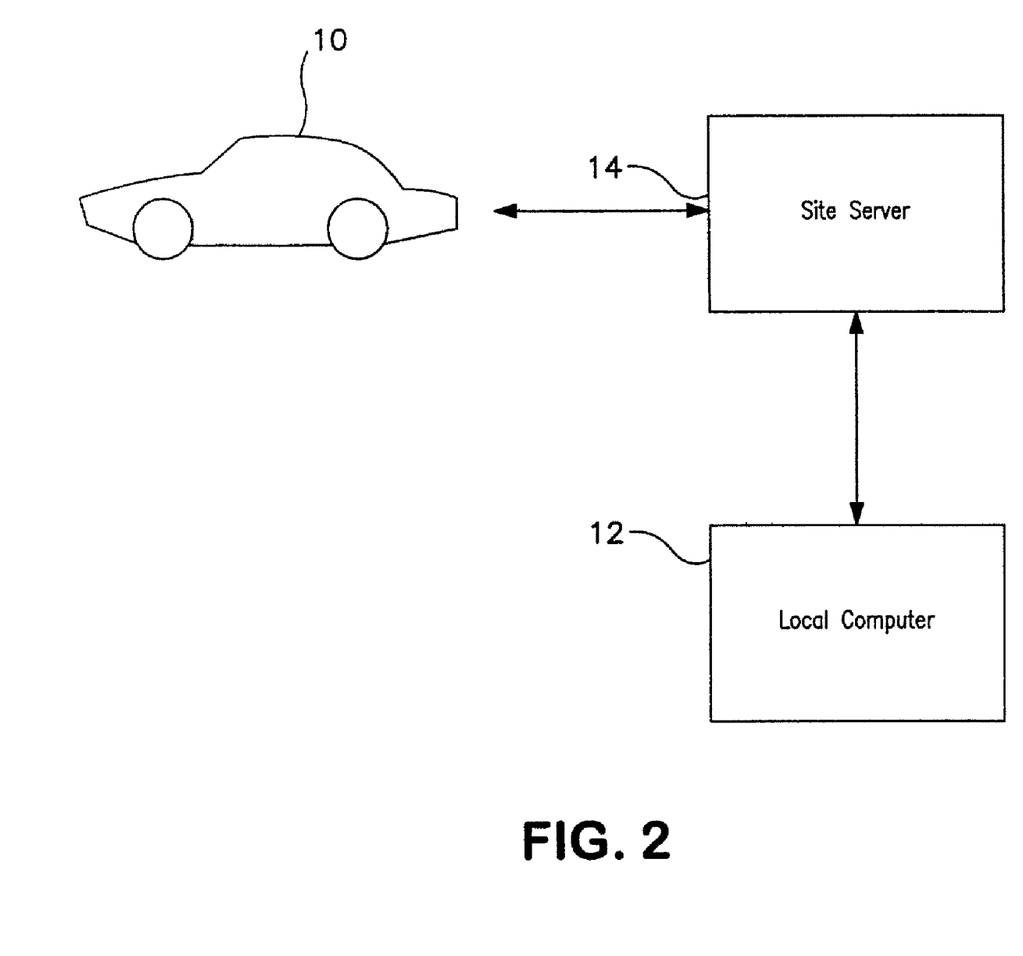
FIG. 2 is a functional block diagram of another embodiment of the invention wherein a motor vehicle receives data directly from an interactive site server.

FIG. 2 illustrates an alternative embodiment of the invention. In this case, set-up data for motor vehicle 10 is received directly from server 14 rather than through local computer 12. From the motor vehicle owner's perspective, the preference setting interface is otherwise identical to the previously described embodiments. Site server 14 may establish a direct telephonic or other suitable communication connection with motor vehicle 10.

The graphical user interface with which a user sets the functions and preferences of the motor vehicle may be highly sophisticated. The options that may be provided are virtually limitless. The following lists some of the functions that could be implemented using the present invention. Many of these allow a driver to personalize his or her car much as cell phones are personalized with distinctive cases, ring tones, greeting messages, etc.

Interior

Entertainment
Radio
Driver enters ZIP code and finds all local radio stations. Driver may select by station frequency, ID, genre (jazz, pop, talk, etc.), or signal strength, and assign to presets on dash or on touch display.

Optionally, set up to scan among chosen stations until the one desired is tuned. Say "OK" and the radio will stay on the currently tuned station. Choose the scan delay time (3 sec, 5 sec, etc.)

Select option to seek out the same genre of station driver was listening to in a new area whenever signal strength falls below a preset level.

Specify favorite stations and/or programs and the audio system will switch at the designated day/time, e.g., on weekdays: NPR in the morning until 9:00, classical radio station until 2:00, sports station until 5:00, news, weather, and traffic until 6:30. Choose different schedule line-up for weekends.

If not in the car when favorite radio program starts, have the system record it (time-shift radio). Play back with the ability to pause, rewind, FF, skip, preserve segments, etc.

CD Changer
Driver places CDs for use in car into CD drive of home computer. Application program reads the CDs and creates a play list that is transferred to car.
Specify favorite songs to play in a desired order or at random.
Play sources at random alternating or predetermined way with preferred radio stations and/or programs and/or MP3 tunes.
MP3 Tunes
Use transfer device to move MP3 files to the car.
Create play list as above.
All audio sources can be programmed to play in an almost infinite way based on time, day of the week or programmed "function button."
Sound & Source Management
Mix and match radio, CDs, MP3s by time of day, randomly, etc.
Set audio level for radio, CD and/or MP3 player to be used when car is started.
Set a "default" source.
Select whether play continues with the same source at the same volume when car is started in the morning, or switches to a different predetermined source at a different volume (e.g., system automatically defaults to AM traffic source if it's between 7:00 and 8:00 AM).
Optimize sound for driver or for cabin.
Set equalization manually or for a specific genre of music—i.e., whenever radio is on jazz station, system defaults to driver's "jazz" EQ.
RESET to factory defaults.
Reminders
Driver may type in any manner of reminders or notes to be read back by voice synthesis at the push of a button at any set time or interval.
Reminders can be played back in the car or from the home computer.

Climate Control
Filter
Automatic or manual.
Recirculate air, or don't, or mix in a selectable ratio.
Fan
Set preferred default setting for fan speed using slider from MIN to MAX. On MIN setting fan blows gently even if a large cabin-temperature change is required. On MAX setting fan blows at full speed until desired cabin temp is achieved. Slider allows for any speed in between.
Comfort Index
Select relative weights of IR sensor, outside and inside temps to optimize comfort for the driver (it can be cool outside but the IR detector sees lots of IR, so it thinks it's summer and the air conditioner comes on). Include humidity in the relative comfort index as below.
Timed Temperature Preset
High and low temperature thresholds can be set and the car can automatically bring cabin temperature to within a selected comfort level at a designated time of day. For example, the system may be programmed to start 5 minutes before a regularly scheduled departure time. As a safety precaution, the system may automatically shut down after running ten minutes without user intervention.
Seat Warmer
Program the seat warmer to activate at a designated time of day or as soon as car is unlocked.
Program a button on the dash to turn on the seat warmer for five minutes every 30 minutes after the car is shut off.
Circuit monitors battery current and shuts down seat warmers when appropriate.
Temperature
Individual user preferences are easily set up and transferred using multiple transfer devices (keys/fobs).
Select "Alfresco" mode and system automatically boosts A/C or heating output as needed when convertible top is lowered.
Different settings for the front passenger seat can be selected depending on whether or not the seat is occupied.
Humidity
Select desired relative humidity with slider control or RESET to factory defaults.

Navigation
Address Entry
Enter addresses using computer keyboard or by dragging and dropping from Web site or address book.
While driving, a designated cockpit button can be pressed to store the current location, which can then be uploaded to the home computer and Web site.
Address Library
Enter or select a new or saved address on the home computer; elect to have this loaded as the destination address when car starts.
Trip Planning
Book hotel rooms (through third-party Web site) by clicking on a map for the final destination and on intermediate stops if appropriate.
Select points of interest within a selected range along the route.
Purchase tickets or passes or make reservations for events or movies or restaurants.
Receive notification when its getting close to time to refill the tank at an upcoming preferred gas station(s).
Route Planning
Select addresses from address library and obtain most efficient route plan given the time of day, distances and known traffic conditions.

Mobile Phone
Phone Book
Selected numbers (and addresses) from computer phone book are available to the phone (and Navigation) system.
Voice Dialing
Activate voice dialing on selected phone numbers from phone book.
Phone Voice Commands
Select key words that will activate voice-dialing functions (call, end, mute, switch).

Personalization
Horn Effects
Select synthesized horn sounds from a list.
Select horn response mode, e.g., pushing the horn switch and holding it in sounds the warning horn sound as normal; one quick tap sounds a different horn sound ("friendly" light-is-green horn); two quick taps sounds a brief personalized "tune", e.g., driver's signature "I'm home" tune.
Interior Lighting Effects
Select the color and intensity of dial/dash backlighting.

Selected preferred cabin "atmosphere" when door is opened (dim cabin lighting, full-on bright, others).
Link lights to doors, e.g., opening only driver's door turns on only left-front map light; when rear doors are opened rear lights also activate.
Sound Effects
Select the sound the turn indicator makes.
Select a sound if the gas cap is not on or seated.
Select a sound when motorized seats are being adjusted.
Personalized seat-belt warning.
Select an alert sound when driving above a preset speed.
Select keys-in-ignition reminder tone.
Visual Effects
Add a photo or image to the LCD.
Screensaver for LCD when vehicle is in Park.
Voice Commands
Select any number of short voice commands to accomplish listed specific in-cabin tasks: "Open sunroof.", Open my window.", "High beams.", etc.

In-Vehicle Interface
Systems & Controls
Customize the function of "function buttons" to control selected functions of any system in the car.
In cars with touch screen LCDs, select from among the components of the systems to be displayed and/or controlled from the LCD.
Buttons
Program any button in the cabin to do just about anything.

Vehicle

Safety
Window & Sunroof Control
Set each window so the occupant of the adjoining seat can only lower the window to a selected level.
Lock window controls at selected seats.
Set a button in the cockpit to lower a preset amount/close all or selected windows and open/close the sunroof.
Set the sunroof to partially open when the inside temperature exceeds a predetermined temperature. Also have the fan come on at the desired speed for selectable intervals.
Seatbelts
Disable engine start if all or selected seats with passengers don't have seat belts fastened.
Speed Governor
Sound a selected warning sound when the car exceeds a specified speed.
Make the warning louder the higher above the preset speed the car goes
Limit the maximum speed of the car.
Limit the maximum rate of acceleration.
Vehicle Tracking
Using GPS or mobile phone, create a log of where the car has been, when and for how long. Also track how hard the car was driven.
Set up real-time tracking of the vehicle
Accident
Set some or all of interior lights to flash and the horn to sound.
Enable transmission of GPS coordinates.

Security
Door Locks
Determine if and at what speed all or selected doors lock.
Set certain doors to unlock only after one or both of the front doors have been opened for a selected period of time.
Enable "lock doors" voice command.
Window Control
(see Safety above)
Enable voice command for "windows up."
Panic Alert
Function button or voice command that locks all doors, rolls up windows, flashes lights, sounds an emergency "siren".
Enable "panic button" to call one or more predetermined phone numbers and deliver and repeat a voice synthesized message when the call is answered.
Add vehicle location to the message.
Door Access
Disable opening one or more doors from the outside unless one or more specific doors are opened from the inside.
Lighting
Select how long and which of the external and internal lights go on after unlock, all doors closed, engine start, vehicle speed.
Alarms
Program security codes.
Select functions for key-fob panic button (e.g., flash lights, activate "I need help!" synthesized-voice horn).

Performance
Suspension Control
Adjust the ride of computerized suspension from sport to luxury or anywhere in between.
Engine Control
Select within a range between economy and performance
Transmission Control
Within factory-set ranges, determine shift aggressiveness (e.g., allow max-rpm shifts or always shift as early as possible for best economy).
Steering
Adjust the feel of steering from stiffer to lighter using an infinitely variable slider.
Winter
Click box to optimize car for poor-weather (e.g., transmission starts in second gear, max traction control intervention, ABS fires at minimum lock detection, etc.).

Tuning
Sport Mode
Set up one-button high-performance profile (e.g., low-economy, max power, max transmission aggressiveness, stiffest shocks).
Turbo Boost
Within factory range, adjust turbo pressure to favor economy, sport mode or point in between.
Handling
Select spring/shock rates, select steering ratio, select traction control response, etc.

Emergency Information
Contacts
In case of emergency or accident, list numbers to contact to speak to hands-free or with a pre-entered voice synthesized call.
In event of airbag deployment, selected contact name and number to flash on LCD to assist rescue personnel in case of driver incapacitation.

Other Notifications
  Transmit vital information to insurance company.
Emergency Aid
  One button summons list and numbers for nearest hospitals, police, fire, pharmacy, etc. based on GPS location—plus preset list of needed phone numbers (friends, family doctor, school, etc).

Information & Service

Trip Logs
  Daily Mileage Logs
    Record and display distances traveled.
    Record routes traveled.
    Record and display fuel consumed.
    Calculate a "cost per mile" of operation, including tire wear, gas mileage, lease and insurance cost, etc.
    Selectively clear various logs.
    Set additional or alternative criteria for "measuring" various parameters of daily use.
  Trip Mileage Logs
    On trips of a preset duration in hours, days, miles or upon pushing a "start trip" function button, record distances between stops, total trip mileage, average speed gas mileage for the entire trip or trip segments, etc.
  Cumulative Data
    Record all possible or selected data from a master reset done at the dealer upon delivery of the car.
  Guest Logs
    Record trip information (route points, speeds, time) from selected start to stop points.
Service & Diagnostics
  Last Service
    At what mileage.
    On what day and time.
    At what dealer.
    At what cost.
    What was done.
  Next Service
    Anticipated date based on how the car is being driven, etc.
    What will be serviced at the next service.
    What bugs in the car need to be fixed.
    What will it cost.
    How much time should it take.
    Request email within predetermined period before the service should be done as a reminder.
    Request phone contact from nearest or selected dealer to set an appointment.
    Request dealer assistance in getting the car to service and back.
  Diagnostics
    Send diagnostic codes to manufacturer and dealer.
    Receive software and firmware-based fixes.
  Firmware & Software Updates
    Receive periodic updates to operating systems, that enable new functionality.
Interactive User's Manual
  Virtual Test Drive
    Animate various controls on the home computer screen.
  Learn & Setup
    Interactively learn the various options and settings available in the car.
  Automatic Tutor
    Based on data collected from vehicle, user is prompted to learn about controls/systems that have not yet been set (e.g., "You have not yet set up your Address Book. Would you like assistance?").
Weather and Driving Conditions
  Forecast
    Obtain weather forecast for travel area.
  Road Conditions
    Obtain reports of road conditions, accidents, clogged traffic, roadwork being conducted, etc.
  Safety Kit
    Obtain list of suggested bring-along items based on weather forecast and planned travel route (snow chains, ice scraper, sunscreen, full tank-few filling stations on the way, etc).
Contact Vehicle Manufacturer
  FAQ
    Access a searchable database of FAQs
  Help
    Access a searchable "help" database.
    Email the service center with specific questions and issues.
  Vehicle-specific Information
    Send vehicle data to manufacturer. Receive feedback and/or contact information after data has been received and analyzed.
  Nearest Dealerships
    Access list with maps of closest dealers, etc.
  Customer Relations
    Subscribe to newsletter.
    Subscribe to other periodic news about vehicle and/or related interests.
    Request notification about new model introductions.
    Elect to receive periodic questionnaires relating to satisfaction, etc.
    Request results of surveys about quality, customer satisfaction, etc.
    Request notification about special offers and events.
Shop
  Driving Accessories
    Order custom car mats, spill-proof coffee mugs, first-aid kits, CD carriers, seat covers, car covers, etc.
  Logo Wear
    Order jackets, shirts, luggage, gloves, sunglasses, hats, golf bags, etc.
  Performance Accessories
    Order optional wheels, gold-trim kits, trailer hitches, aero body kits, roof racks, bicycle carriers, audio/visual equipment, etc.
  Events
    Order tickets to manufacturer-sponsored races, motor shows, sporting events, social gatherings, etc.

Figure 3:
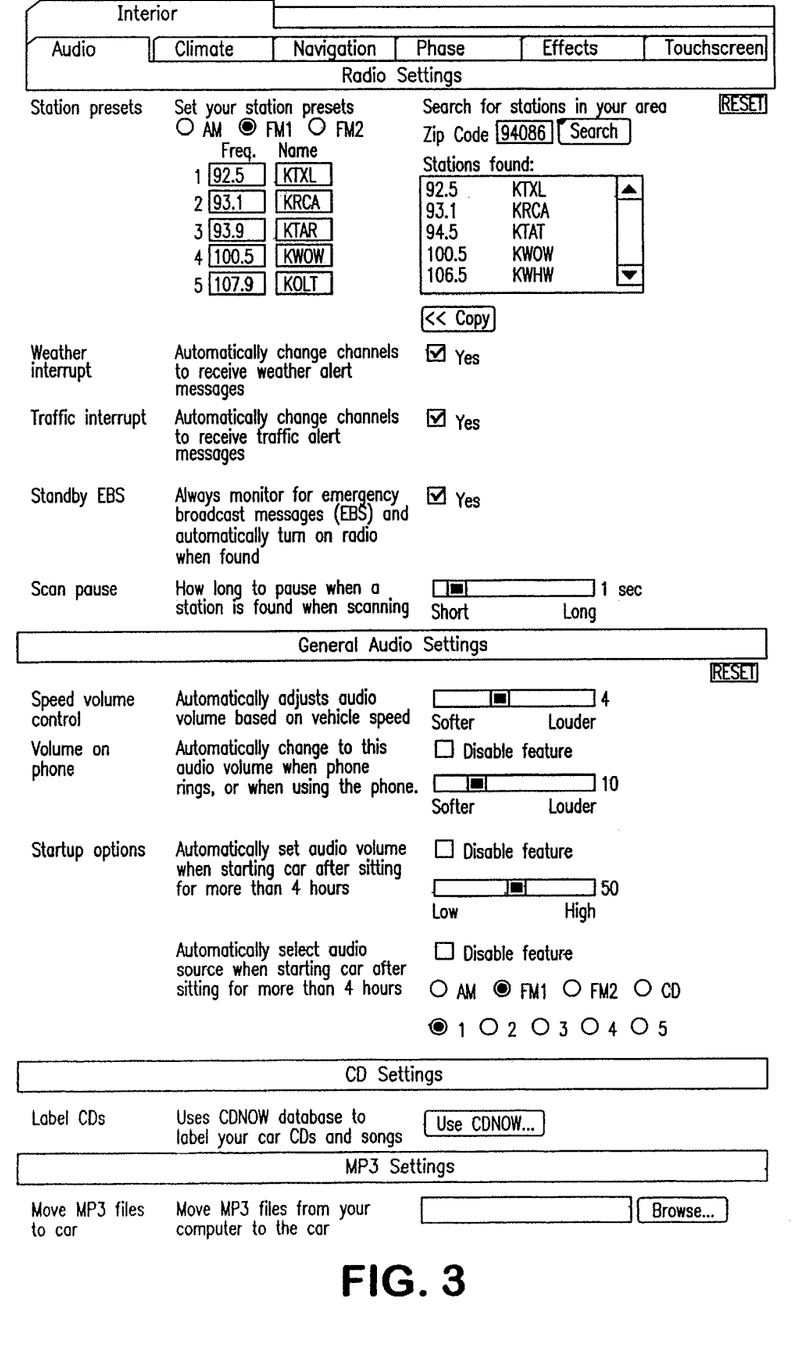
FIG. 3 illustrates a graphical user interface for setting programmable features of a vehicle entertainment system.

FIG. 3 illustrates a portion of a graphical user interface that may be employed with the present invention to set programmable features of a motor vehicle's entertainment system. The interface utilizes pull-down menus, data entry windows, buttons, sliders, etc., which are readily implemented by persons proficient in website design. The programmable features shown in FIG. 3 are merely illustrative of those that can be implemented. The particular features that are made available on the graphical user interface would be specified by the motor vehicle manufacturer and would be constrained by the hardware and software specifications of the particular vehicle.

Figure 4:
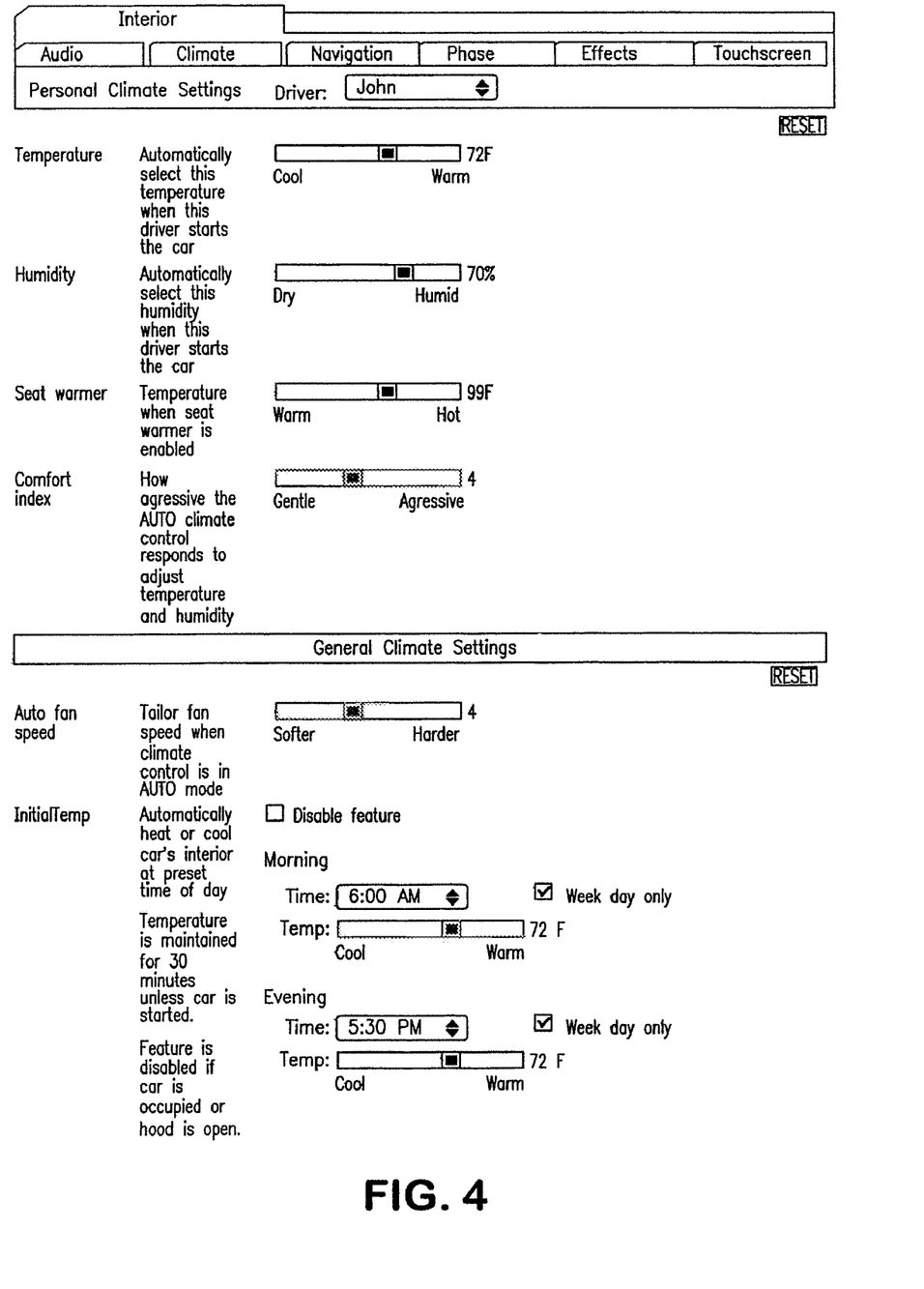
FIG. 4 illustrates a graphical user interface for setting programmable features of a vehicle climate control system.

FIG. 4 illustrates a portion of a graphical user interface that may be employed with the present invention to set programmable features of a motor vehicle's climate control system.

Use of the present invention facilitates customized driver controls and displays. For example, touch screen LCD or similar display panels are now used in many automobiles. Using a graphical user interface, a driver can design a customized set of controls for operating features of interest to that driver. One driver may wish to have certain radio selections readily available, whereas another driver may wish to have available a selection of destinations for the navigation system. These preferences are communicated via the transfer device as described above. Controls that are customized in this manner are not limited to touch screen selections. By the same process, driver defined functions may be assigned to buttons, dials and other mechanical controls as well to create individualized "function keys." Likewise, displays available to the driver may also be customized.

Figure 5:
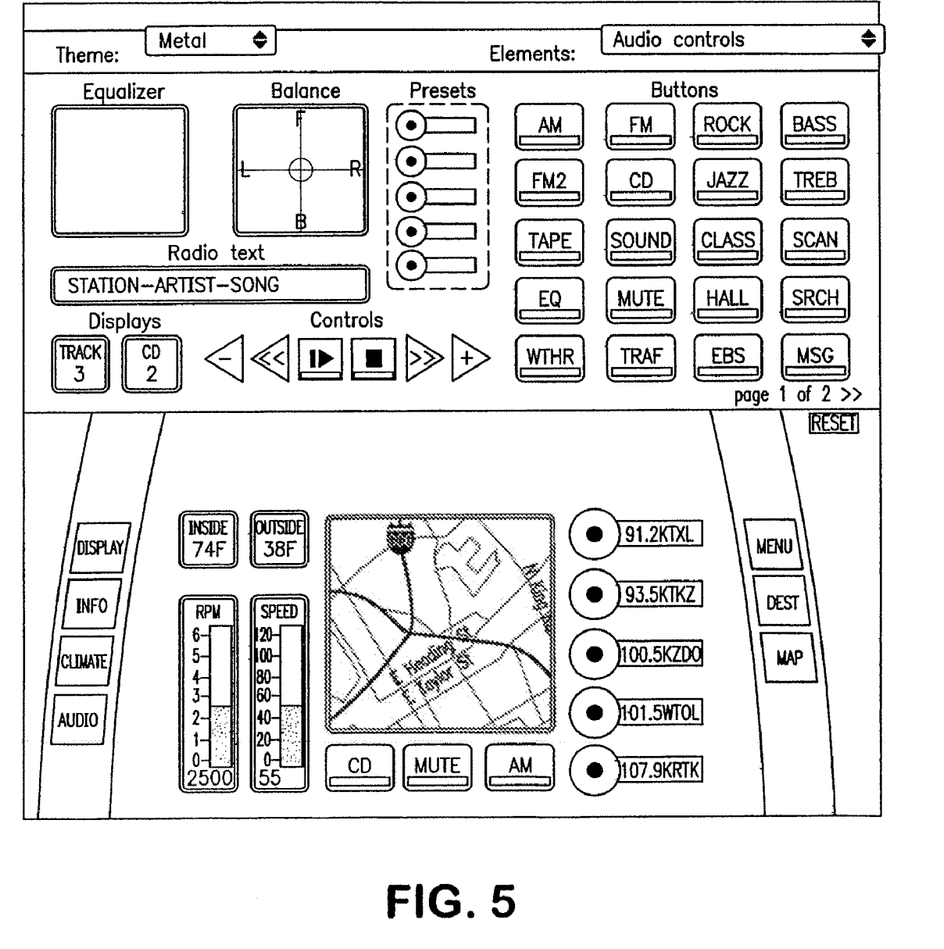
FIG. 5 illustrates a graphical user interface for customizing a vehicle control/display panel.

FIG. 5 illustrates a portion of a graphical user interface for creating a customized control/display panel. The top portion of the interface provides a menu of controls and displays that may be dragged and dropped onto a graphic representation of the vehicle's control display panel in the bottom portion of the interface. In this manner, a user may construct a hierarchy of control/display panels for various systems of the vehicle and/or driving situations. A "home" panel may be configured with controls and displays that are most used by the driver. Subsidiary panels, accessible from the "home" panel, may be created in whatever configurations the driver desires. Selections available to the driver when creating customized panels may include background colors and/or patterns. The panel may be programmed with "wallpaper" and "screensavers", much as computer displays are customized by their users.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method of controlling an automobile sound system comprising:
   providing a server on a global computer network with a graphical user interface tailored to an automobile sound system and the programmable features thereof;
   accessing the server with a user's computer and operating the graphical user interface to program a selected automobile sound system function;
   transferring data representative of the selected automobile sound system function to an automobile sound system remote from the user's computer.

2. The method of claim 1 wherein transferring data representative of the selected automobile sound system function comprises transferring the data to a transfer device and then transferring the data from the transfer device to the automobile sound system.

3. The method of claim 1 wherein transferring data representative of the selected automobile sound system function comprises transferring the data from the server to the automobile sound system.

4. The method of claim 3 wherein the data is transferred from the server to the automobile sound system via telephonic communications.

5. The method of claim 1 wherein transferring data representative of the selected automobile sound system function comprises transferring the data from the user's computer directly to the automobile sound system.

6. A method of controlling an automobile heating, ventilating and air conditioning (HVAC) system comprising:
   providing a server on a global computer network with a graphical user interface tailored to an automobile HVAC system and the programmable features thereof;
   accessing the server with a user's computer and operating the graphical user interface to program a selected automobile HVAC system function;
   transferring data representative of the selected automobile HVAC system function to an automobile HVAC system remote from the user's computer.

7. The method of claim 6 wherein transferring data representative of the selected automobile HVAC system function comprises transferring the data to a transfer device and then transferring the data from the transfer device to the automobile HVAC system.

8. The method of claim 6 wherein transferring data representative of the selected automobile HVAC system function comprises transferring the data from the server to the automobile HVAC system.

9. The method of claim 8 wherein the data is transferred from the server to the automobile HVAC system via telephonic communications.

10. The method of claim 6 wherein transferring data representative of the selected automobile HVAC system function comprises transferring the data from the user's computer directly to the automobile HVAC system.

* * * * *